United States Patent
Perlin et al.

(10) Patent No.: US 7,168,808 B2
(45) Date of Patent: Jan. 30, 2007

(54) PHASE RETARDANCE AUTOSTEREOSCOPIC DISPLAY

(75) Inventors: Kenneth Perlin, New York, NY (US); Joel S. Kollin, New York, NY (US)

(73) Assignee: New York University, New York, NY (US)

( * ) Notice: Subject to any disclaimer, the term of this patent is extended or adjusted under 35 U.S.C. 154(b) by 0 days.

(21) Appl. No.: 10/832,701

(22) Filed: Apr. 27, 2004

(65) Prior Publication Data
US 2005/0052738 A1    Mar. 10, 2005

Related U.S. Application Data

(60) Provisional application No. 60/467,519, filed on May 2, 2003.

(51) Int. Cl.
*G03B 21/00* (2006.01)
*G02B 27/22* (2006.01)

(52) U.S. Cl. .............................. 353/7; 353/10; 353/121; 359/462

(58) Field of Classification Search ................... 353/7, 353/10, 121; 359/454, 459, 460, 462; 701/45; 280/735; 364/516, 444
See application file for complete search history.

(56) References Cited

U.S. PATENT DOCUMENTS 5,583,795 A * 12/1996 Smyth ........................ 702/150
5,822,117 A * 10/1998 Kleinberger et al. ........ 359/465
5,973,831 A * 10/1999 Kleinberger et al. ........ 359/465
6,061,084 A * 5/2000 Perlin .......................... 348/51
6,252,707 B1 * 6/2001 Kleinberger et al. ........ 359/465
2003/0209893 A1* 11/2003 Breed et al. ................ 280/735

* cited by examiner

*Primary Examiner*—Melissa J. Koval
(74) *Attorney, Agent, or Firm*—Ansel M. Schwartz

(57) ABSTRACT

An apparatus for viewing an image includes a screen on which an image of a superimposed projection for left and right eye views of a viewer is displayed image. The apparatus includes a mechanism for projecting the projections onto the screen image. The apparatus includes a rear retarder disposed in front of the screen image. The apparatus includes a front retarder disposed in front of the rear retarder image. The apparatus includes a mechanism for applying an increasing ramp of phase retardance across an image in the rear retarder, and applying a decreasing ramp of phase retardance across the image in the front retarder so a constant phase retardance is created across an entire surface of the screen disposed behind the rear retarder and the front retarder when seen by a viewer in front of the front retarder. An apparatus for viewing an image includes a display mechanism which produces a display such that there is a first point and a second point in space whereby the sum of phase is zero for the first point and 0+180 degrees for the second point.

14 Claims, 5 Drawing Sheets

PHASE RETARDANCE AUTOSTEREOSCOPIC DISPLAY

This application is a continuation of provisional application 60/467,519 filed May 2, 2003.

FIELD OF THE INVENTION

The present invention is related is related to an autostereoscopic display. More specifically, the present invention is related to an autostereoscopic display having a constant phase retardance created across an entire surface of a screen.

BACKGROUND OF THE INVENTION

There are two notable examples of prior art relative to this invention. Both of these use binary polarization switching between two orthogonal polarization states rather than the continuous polarization phase retardation disclosed here.

One example of prior art is a previous invention by Perlin (U.S. Pat. No. 6,061,084, incorporated by reference herein) which uses a variable pitch parallax barrier comprised of a Pi cell (a Pi cell is a binary polarization switching device that can be switched at approximately 200 cycles per second) used to produce alternating opaque and transparent vertical stripes on a light-blocking screen which is placed 50–100 mm in front of an image-producing screen. At any moment in time, each of the viewer's two eyes sees a different image through the transparent gaps between the opaque Pi cell stripes. The pattern of Pi cell and image stripes are determined by the viewer's head position. Specifically, the pitch between the stripes is inversely related to the distance of the viewer to the display.

In the preferred embodiment of that invention, the clear gaps (and the image stripes behind them) are ⅓ the width of the opaque stripes. The gaps and corresponding image stripes simultaneously shift between 3 different positions or phases in a repeating cycle, so that at the end of each cycle every pixel has been seen by each eye, but different columns of pixels have been seen at different times. Thus each pixel alternates between right eye information, left eye information and black (no information). Using three phases in the cycle permits the use of a black buffer stripe of ½ the image stripe width on the side of each image stripe, thereby allowing for slight misregistration of stripe positions relative to actual head position. Without the buffer stripes, any misregistration errors would appear very visibly as vertical slits of crosstalk between the two different images.

Another example of prior art by Kleinberger et al. (U.S. Pat. Nos. 6,252,707, 5,973,831, 5,822,117, incorporated by reference herein) typically uses two binary polarization switching devices, one adjacent to the screen and another spaced further away from the screen in a manner similar to that described above. The polarizing device next the screen is used to polarize the display in alternating orthogonal polarizations (i.e. left and right handed, vertical and horizontal, or −45 and +45 from vertical, respectively). The second polarizing device also presents a set of alternating polarization stripes, such that each eye see different parts of the screen through different sets of stripes matching up in polarization along the lines determined by the rays between the screen and each eye. In another variation of this invention, the second barrier stripes are calculated so that the entire image is only visible from one eye. By activation of a third, uniform polarization switching layer, the entire image becomes visible only to the other eye. In yet another variation of this invention, alternating clear and opaque stripes are used to separate left and right eye view via parallax as in Perlin U.S. Pat. No. 6,061,084, incorporated by reference herein, but with only two phases. It should be noted that as stated above, all of these two phase binary systems in Kleinberger et al. (U.S. Pat. Nos. 6,252,707, 5,973,831, 5,822,117, incorporated by reference herein) lead to visible banding artifacts, due to crosstalk even with minor misregistration of the system relative to actual eye position. To mitigate this, fixed black buffer areas can be utilized around the image stripes, and Kleinberger et al. (U.S. Pat. Nos. 6,252,707, 5,973,831, 5,822,117, incorporated by reference herein) stipulate that optical devices such as lens arrays can be used to fill in the resulting blank areas. Also, Kleinberger et al. (U.S. Pat. Nos. 6,252,707, 5,973,831, 5,822,117, incorporated by reference herein) also propose an implementation using a checkboard pattern instead alternating stripes to spatially interlace the left and right eye views.

SUMMARY OF THE INVENTION

The present invention pertains to a method for viewing an image. The method comprises the steps of applying an increasing ramp of phase retardance across an image in a rear retarder. There is the step of applying a decreasing ramp of phase retardance across the image in a front retarder so a constant phase retardance is created across an entire surface of a screen disposed behind the rear retarder and the front retarder when seen by a viewer in front of the front retarder.

The present invention pertains to an apparatus for viewing an image. The apparatus comprises a screen on which an image of a superimposed projection for left and right eye views of a viewer is displayed image. The apparatus comprises means for projecting the projections onto the screen image. The apparatus comprises a rear retarder disposed in front of the screen image. The apparatus comprises a front retarder disposed in front of the rear retarder image. The apparatus comprises means for applying an increasing ramp of phase retardance across an image in the rear retarder, and applying a decreasing ramp of phase retardance across the image in the front retarder so a constant phase retardance is created across an entire surface of the screen disposed behind the rear retarder and the front retarder when seen by a viewer in front of the front retarder.

The present invention pertains to an apparatus for viewing an image. The apparatus comprises an eye tracker which tracks positions of the eyes of a viewer image. The apparatus comprises a display mechanism in communication with the eye tracker which produces a display such that there is a first point and a second point in space whereby the sum of phase is zero for the first point and 0+180 degrees for the second point.

BRIEF DESCRIPTION OF THE DRAWINGS

In the accompanying drawings, the preferred embodiment of the invention and preferred methods of practicing the invention are illustrated in which.

DETAILED DESCRIPTION

Figure 1:
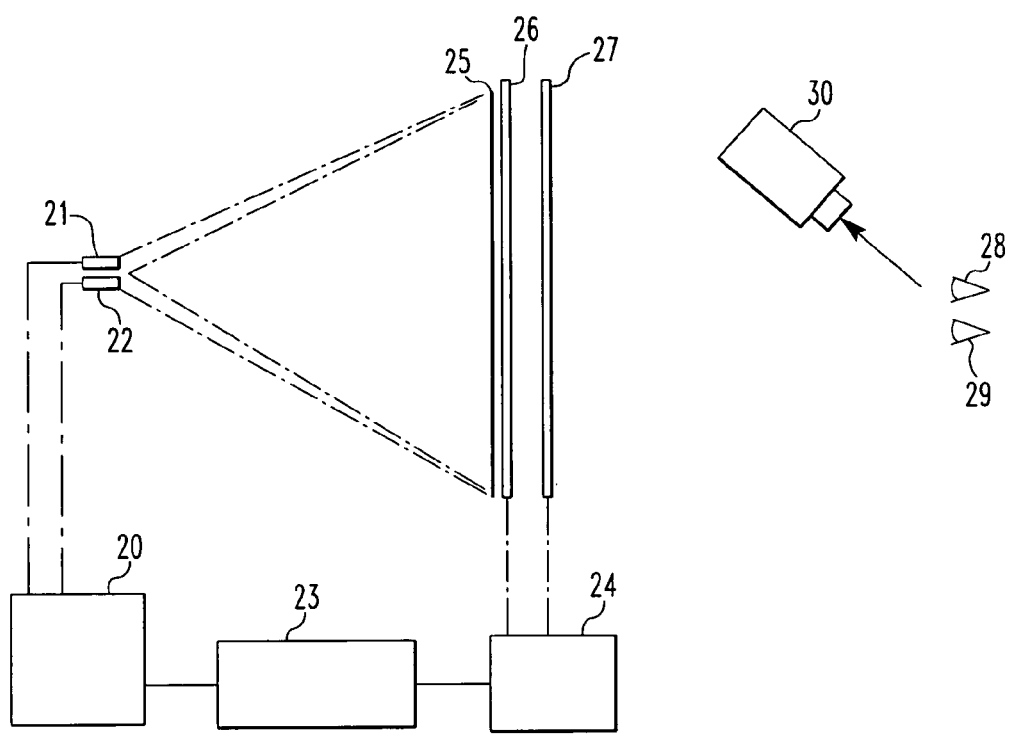
FIG. 1 is a schematic representation of component parts of the present invention.

Referring now to the drawings wherein like reference numerals refer to similar or identical parts throughout the several views, and more specifically to FIG. 1 thereof, there is shown an apparatus for viewing an image. The apparatus comprises a screen 25 on which an image of a superimposed projection for left and right eye views of a viewer is displayed image. The apparatus comprises means for projecting the projections onto the screen 25 image. The apparatus comprises a rear retarder 26 disposed in front of the screen 25 image. The apparatus comprises a front retarder 27 disposed in front of the rear retarder 26 image. The apparatus comprises means for applying an increasing ramp of phase retardance across an image in the rear retarder 26, and applying a decreasing ramp of phase retardance across the image in the front retarder 27 so a constant phase retardance is created across an entire surface of the screen 25 disposed behind the rear retarder 26 and the front retarder 27 when seen by a viewer in front of the front retarder 27.

The present invention pertains to a method for viewing an image. The method comprises the steps of applying an increasing ramp of phase retardance across an image in a rear retarder 26. There is the step of applying a decreasing ramp of phase retardance across the image in a front retarder 27 so a constant phase retardance is created across an entire surface of a screen 25 disposed behind the rear retarder 26 and the front retarder 27 when seen by a viewer in front of the front retarder 27.

Preferably, the projecting means includes a right eye projector 21 and a left eye projector 22 for right and left eye views, respectively, on the screen 25. The right eye projector 21 and the left eye projector 22 preferably have orientations orthogonal to each another. Preferably, the applying means includes a dual-head video card 20 for controlling outputs for the right eye projector 21 and the left eye projector 22. The applying means preferably includes a computer 23 which controls the video card 20. Preferably, the applying means includes an electronic system 24 for controlling the front retarder 27 and the rear retarder 26, the electronic system 24 in communication with the computer 23.

The present invention pertains to an apparatus for viewing an image. The apparatus comprises an eye tracker 30 which tracks positions of the eyes of a viewer image. The apparatus comprises a display mechanism in communication with the eye tracker 30 which produces a display such that there is a first point and a second point in space whereby the sum of phase is zero for the first point and 0+180 degrees for the second point.

The display mechanism in a preferred embodiment is shown in FIG. 1.

Basic Idea:

A new enabling technique for single observer active autostereoscopic display is described herein. The new technique consists of a screen 25 having two successive actively switched space-varying phase-retarders in front of a cross-polarized passive stereoscopic display. The rear phase-retarder retards the phase of the vertical component of incoming light by a position-dependent phase angle: $(ax+b) \mod 2\pi$, where x is horizontal position across the screen 25 width, and where a and b are varied according to the observer's position. Meanwhile, the front phase-retarder retards the phase of the vertical component of incoming light by a position-dependent phase angle: $-(cx+d) \mod 2\pi$, where x is horizontal position across the screen 25 width, and where c and d are also varied according to the observer's position. By proper choice of a,b,c and d, linearly polarized light that emerges from behind the two phase-retarders can be flipped to the orthogonal polarization when seen from the point of view of the observer's right eye, while remaining unaffected when seen from the point of view of the observer's left eye.

If a polarizing filter is placed in front of the screen 25, then the display becomes autostereoscopic to an observer whose eye positions are tracked: if two cross-polarized images are placed behind the screen 25, then one will be visible only to the observer's left eye, and the other will be visible only to the observer's right eye.

Tracking of the observer's eye positions can be performed by many currently known methods, one of which is a feature-recognizing video capture system such as the "faceLAB" method developed by Seeing Machines, Inc. This method is described at http://www.seeingmachines.com, incorporated by reference herein. Seeing Machines, Innovations Building, Corner Garran and Eggleston Road, Can berra ACT 0200, Australia.

How is it an improvement over existing mechanisms?

This new mechanism is an improvement over existing mechanisms by virtue of having all of the following properties:

1. Full 50% light transmittance to each eye (the theoretical maximum). This is the same efficiency achieved by passive stereoscopic displays.
2. The position and orientation of a tracked observer can be widely varied in all dimensions. In particular, the device continues to function properly as the observer's distance from the display screen 25 varies.
3. No artifacts of the technique are visible anywhere on the image: All pixels of the image are visually equal, and there is no pixel-level image variation associated with the method.
4. Superior "failure" mode when observer position is miscalibrated: A slight misalignment to the left or right merely results in a small amount of uniform visible cross-talk between the two source images, not in any artifacts that vary across the image.
5. No active switching is required while the observer is not moving. This enables use with displays that have slow refresh rates. This includes LCD flat-panel displays, such as the displays of notebook computers, handheld computers and cell phones.
6. In the projection embodiment of the method, no large-scale active electro-optically switching elements are required. In this embodiment, all actively switching elements can be the same size the spatial light modulator element of a typical projector (on the order of 35 mm in diagonal dimension), and therefore can be fit easily inside a compact projector unit.

Component Parts (see FIG. 1):

20 is a dual-head video card (frame buffer) for rendering and controlling the outputs for the left and right eye views.

21 and 22 are projectors for left and right eye views, each on of which has a polarizing filter in front of it with a different orientation, such that the orientations are orthogonal to each other.

23 is a computer which controls the system and manipulates the model rendered by 20.

24 is electronic system for controlling the two retarder devices 26 and 27.

25 is the polarization-preserving diffusion screen, such that the images from 21 and 22 are superimposed but have orthogonal polarization with respect to each other.

26 is the first or "rear" phase retardation device.

27 is the second or "front" phase retardation device.

28 and 29 are the viewer's right and left eyes.

30 is the eye position tracker.

Manufacturing Source of Phase Retarders:

This phase-retardance behavior can currently be achieved by commercially Zero Twist Nematic (ZNT) liquid crystal optical switching devices from Boulder Nonlinear Systems. This class of devices is described at:

http://www.bnonlinear.com/pages/rotators.html.

To implement the active autostereoscopic display shutter described below, two ZTN switching devices are used. Each of these is 150 mm in width, consisting of 256 individually switchable vertical stripes across its width. Each stripe can be continually varied to effect any phase retardance between 0 and $2\pi$.

Principle of Operation (Overview):

The discussion which follows refers to the two mutually orthogonal polarization orientations 45 degrees from vertical to the left, and 45 degrees from vertical to the right, respectively. These two orientations are chosen only for clarity of exposition. The invention will function equally well with any mutually orthogonal polarization orientations, including orientations that are circularly polarized.

The following key principles make the screen 25 work:

1. A linear polarizer oriented at 45 degrees will block all light which is linearly polarized at −45 degrees.
2. Light which is linearly polarized at 45 degrees becomes linearly polarized at −45 degrees when the phase of its vertical component is retarded by n.
3. The above two principles lead to the following observation: Consider a screen that retards the phase of the vertical component of incoming light. If a 45 degree linearly polarizing filter is placed in front of this screen, then wherever the screen does not retard phase, the polarizer will block all incoming light was originally polarized at −45 degrees. In contrast, where the screen retards phase by n, the polarizer will block all incoming light that was linearly polarized at 45 degrees.
4. By applying a linearly increasing ramp of phase retardance across the image in a rear retarder 26, while applying a linearly decreasing ramp of phase retardance across the image in a front retarder 27, a constant phase retardance can be created across the entire surface of the screen, when seen from any point in front of the screen.
5. With the proper choice of ramp values for these two cross-ramped screens, effect a phase difference of zero can be effected across the entire surface of the screen when viewed from an observer's left eye position, while a phase difference of n can be effected across the entire surface of the screen when viewed from an observer's right eye position.
6. By combining principle 3 with principle 5, two such cross-ramped screens can be employed, with a 45 degree polarizing filter placed in front, to allow only 45 degree polarized light to be visible at an observer's left eye, and only −45 degree polarized light to be visible at an observer's right eye.

Figure 2A:
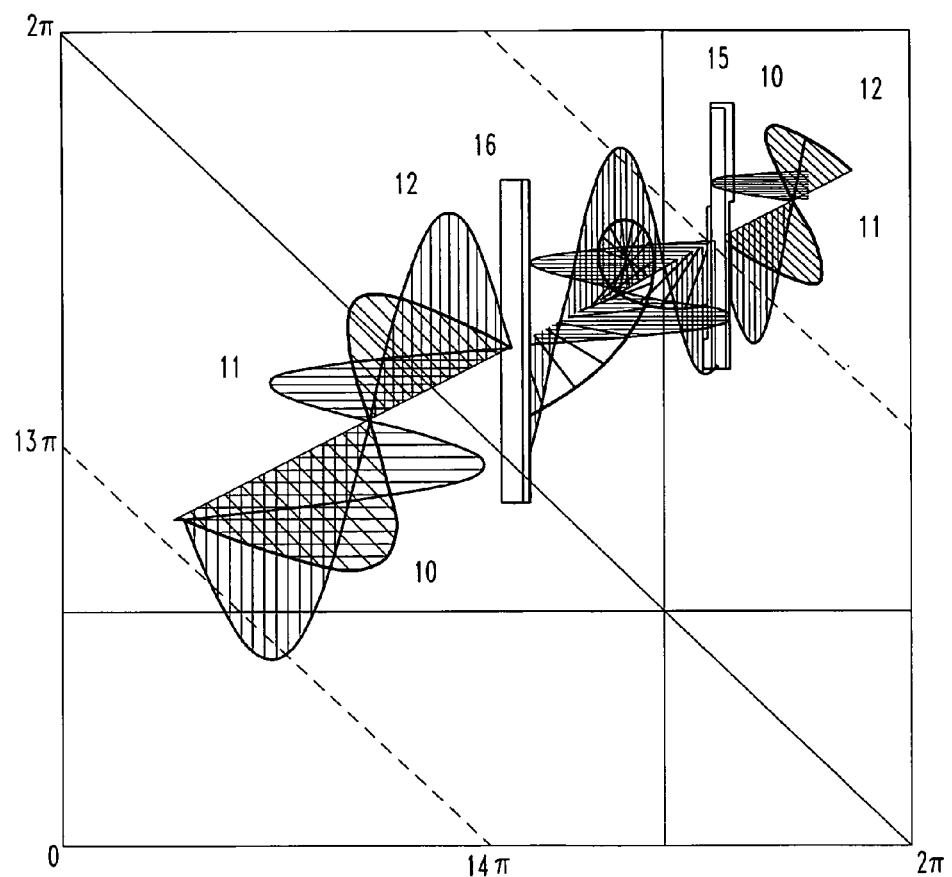
FIG. 2a shows the polarization rotation for one ray (wave) of the left-eye view from one pixel on the screen plane (1 on FIG. 1) as it travels along the system into the left eye. The polarization of this wave ends up unchanged for the implementation shown in FIG. 1.
Figure 2B:
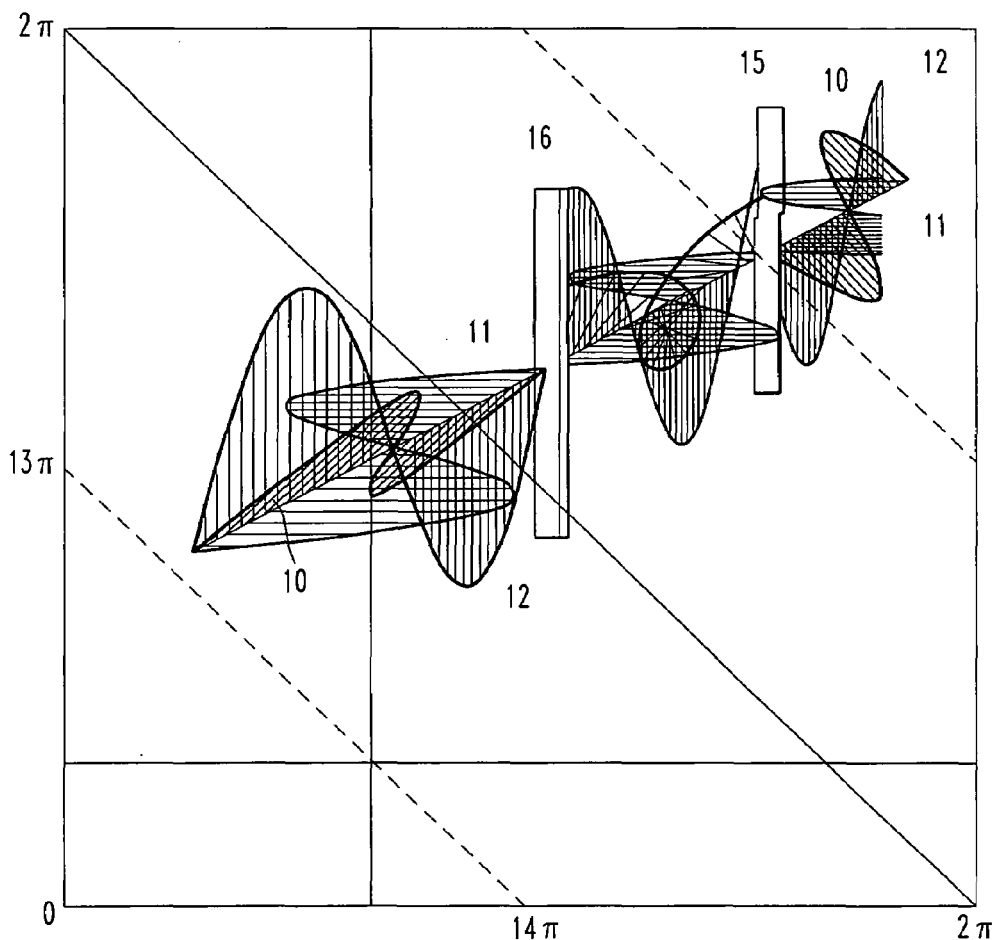
FIG. 2b shows the polarization rotation for a left-eye view ray from the same pixel that would have entered the right eye if it had not been blocked by the polarizer (not shown) due to the polarization being rotated 90 degrees.

Principle of Operation in Detail:

FIG. 2 shows the effects of the retarders on the polarization of the light for each eye's view. FIG. 2a shows the polarization rotation for one ray (wave) of the left-eye view from one pixel on the screen 25 plane (1 on FIG. 1) as it travels along the system into the left eye. The polarization of this wave ends up unchanged for the implementation shown in FIG. 1, and FIG. 2b shows the polarization rotation for a left-eye view ray from the same pixel that would have entered the right eye if it had not been blocked by the polarizer (not shown) due to the polarization being rotated 90 degrees.

For the first diagram (13), the diagonal linearly polarized light from the left view (10) can be considered a superposition of horizontal and vertical components (11 and 12). After passing through the first retarder (15) the vertical component is retarded by $3/2\pi$ as seen on the horizontal axis (19) with respect to the horizontal component, and the composite polarization becomes left-handed circularly polarized. After propagating the separation distance, the wave passes through the second retarder (16) which then retards the wave by another $\pi/2$ shown on vertical axis (13), leading to a total rotation of $2\pi$, which is equivalent to 0. Thus the polarization of the wave leaving the system is identical to its starting orientation, and it passes through the final polarizer (not shown). Not shown is the light from the same pixel but from the right-eye view, which also ends up the same polarization as it started—orthogonal to the left-eye view's—and is therefore blocked by the final polarizer.

In FIG. 2b, some of the light from the same pixel of the left eye view heads towards the right eye, passing through the two retardation layers at different positions. In this case the vertical component is relatively retarded first at (15) by about $¾\pi$ making the wave elliptically polarized, and then impinges upon second retarder (16) which adds another retardation of about $\pi/4$. The sum total of retardation after leaving the second retarder is $\pi$, leading to a resultant polarization which is linear and orthogonal to the original polarization. As result, this wave is completely blocked by the final polarizer. The light from the right-eye view coming from the same pixel is also rotated by $\pi$, remaining orthogonal to the left-eye view light at all times and therefore passes through the polarizer.

Figure 3A:
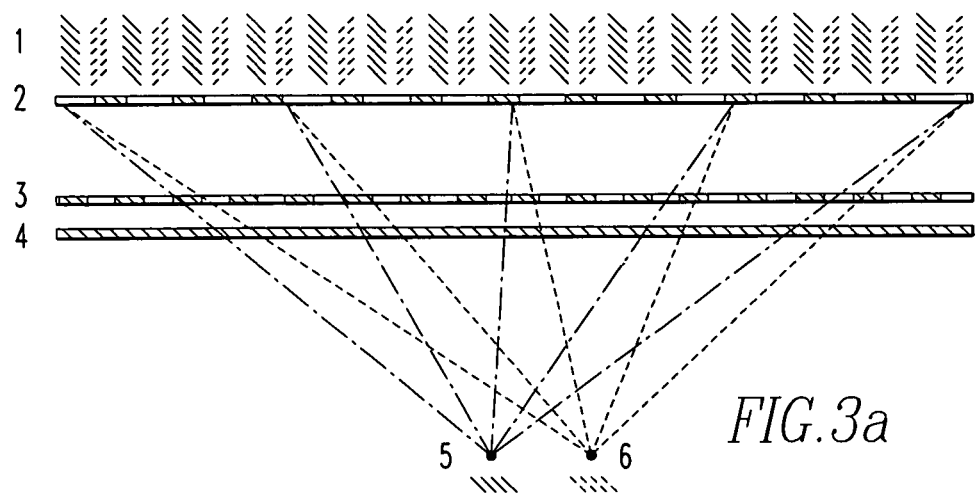
FIGS. 3a and 3b are schematic representations of a display using crossed linearly ramped retarders.
Figure 3B:
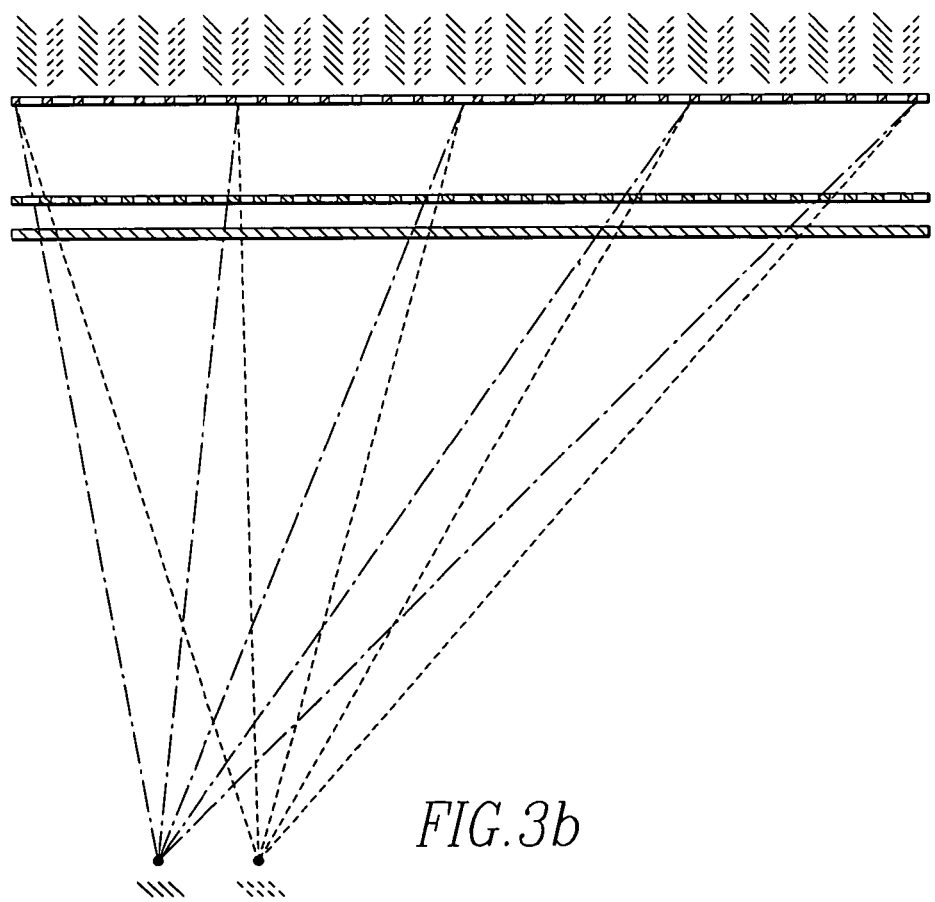

FIGS. 3a and 3b show a bird's eye view of the invention being used by a near and a far observer, respectively. (1) shows two superimposed images at the screen 25 plane, with orthogonal polarizations for the left and right eye views. In this diagram they are illustrated by solid top-left and dashed top-right diagonal lines, respectively, indicating the polarization orientations. Just in front of the screen 25 is (2) the first linear ramped phase retarder, which retards the phase of the vertical component of incoming light by a position-dependent phase angle: (ax+b) mod $2\pi$, where x is horizontal position across the screen 25 width, and where a and b are varied according to the observer's position. Approximately 50–100 mm in front of the first retarder is a second similar device (3) which retards the phase of the vertical component of incoming light by a position-dependent phase angle: (ax+b) mod $2\pi$, where x is horizontal position across the screen 25 width, and where c and d are also varied according to the observer's position. By proper choice of a,b,c and d, linearly polarized light that emerges from behind the to phase-retarders can be flipped to the orthogonal polarization when seen from the point of view of the observer's right eye (5), while remaining unaffected when seen from the point of view of the observer's left eye (6). Polarizing filter (4) with the same polarization as the left eye view is placed in front of (3), so the left view will be visible only to the observer's left eye, and the right-eye view (now orthogonal to its original polarization) will be only to the observer's right eye.

Note that in these illustrations, the left- and right-eye views are encoded at the screen 25 plane as orthogonal diagonal linear polarizations, but they could be any two orthogonal polarizations—cf horizontal and vertical, or right- and left-handed circular polarizations.

Alternate allowable arrangements of the screens 25:

Here are four distinct possible arrangements of the component screens 25 that all make use of the described invention:

1. The image display can consist of a flat screen display, such as an LCD panel display, with alternate pixels or scan lines or scan columns having crossed polarization. The two phase retarder screens are placed in front of this screen.
2. The image display can consist of two rear-projectors, which project cross-polarized images onto a common display screen. This arrangement allows a full resolution image to be seen by both eyes of the observer. The two phase retarder screens are placed in front of this screen.
3. The image display can consist of a flat screen display, such as an LCD panel display, with alternate pixels or scan lines or scan columns having crossed polarization, which is placed in front of the two phase retarder screens. In this arrangement the pair of phase retarder screens functions as a light structuring light source. Also, in this arrangement the differing polarization across the flat screen display must be effected by fixed half-wave phase retarders placed behind the image display panel. This arrangement has the advantage that it allows the observer to see the image display panel without any other intervening screens in front of it.
4. A projection display, seen in side view in FIG. 4, has the following additional advantages: (i) it allows all of the large-scale optical components to be passive, which greatly reduces cost and complexity of the system, and (ii) it allows the observer maintain a distant focus. Maintaining distant focus permits the system to be used for viewing scenes which contain objects that appear to be very far away, such as large panoramas and landscapes. This is not practical with a near-focus device, such as a direct view stereoscopic monitor, since humans experience extreme discomfort when they attempt to maintain parallel eye directions (as when looking at a distant object) while simultaneously focusing on an object in the near distance, such as a computer or television monitor. For this reason, direct view stereoscopic displays are generally found to be practical only to simulate objects which are at most 60 mm further away from the observer than is the monitor itself.

Figure 4:
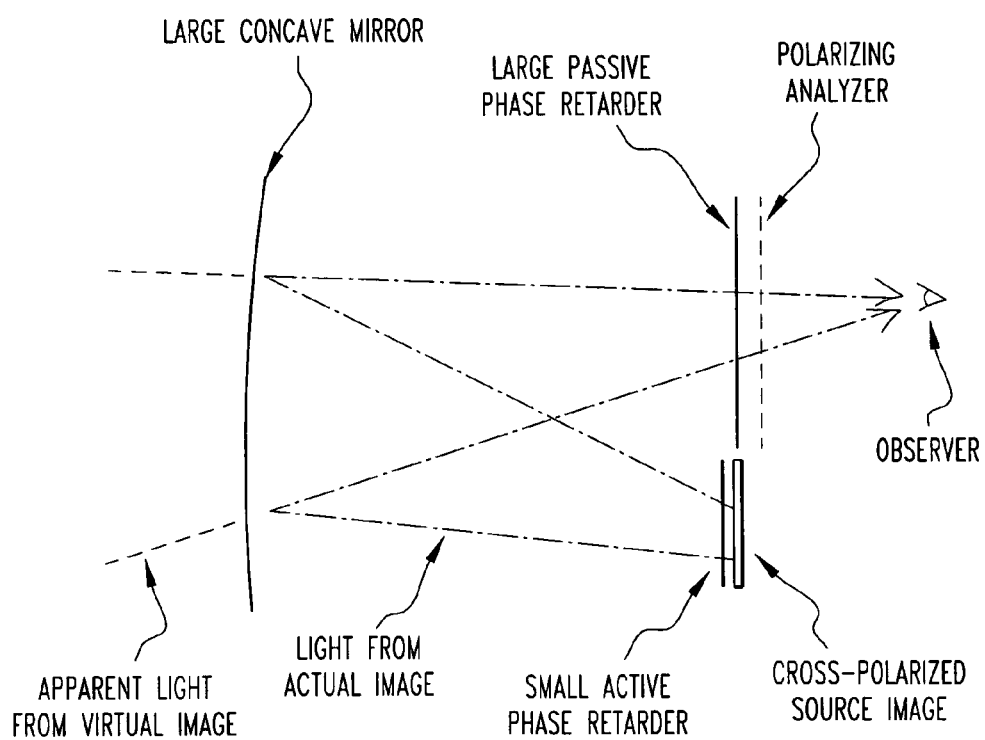
FIG. 4 is a schematic representation of a projection version of a display of the present invention.

In the projection version of the display, the two cross-polarized images can either be projected onto a large screen at a great distance (for example, six meters or more from the observer), or else can be re-imaged to appear large and far away, through the use of a large focusing lens or concave mirror. The latter arrangement is shown in FIG. 4.

The observer looks at this projected image through a passive screen 25 which consists of a phase retarder behind a passive polarizing analyzer. The observer is positioned directly in front of this passive screen 25; the distance from the observer to the passive screen 25 is not critical: Typical distances are 25 cm to 65 cm.

The phase retardance of the passive phase retarder varies with horizontal position across its surface, increasing linearly by $\pi$ radians every 65 mm. 65 mm is the lateral distance between the left and right eye of an average observer.

Because the light rays coming from the projected image are very nearly parallel, light from any point on the projected image will reach the observer's left and right eyes, respectively, only after passing through respective locations on the passive phase retarder screen 25 that are approximately 65 mm apart.

The tracked positions of the observer's eyes are used to vary the phase and spatial frequency of the phase retardance of the projected image, so that the left eye of the observer will receive a total of zero radians of phase retardance across the perceived image, and simultaneously the right eye of the observer will receive a total of $\pi$ radians of phase retardance across the perceived image. Because the first, active, phase retarder is in the image plane of the original cross-polarized source images, this active phase retarder can be very small—on the order of the size of a source projection image, typically about 35 mm diagonal. The small size of this active phase retarder significantly reduces the total expense of the system.

Finally, as in all embodiments of the invention, the passive polarizing analyzer then blocks one source image for the left eye, and the source image for the right eye, allowing each eye to see only one of the two cross-polarized source images.

Although the invention has been described in detail in the foregoing embodiments for the purpose of illustration, it is to be understood that such detail is solely for that purpose and that variations can be made therein by those skilled in the art without departing from the spirit and scope of the invention except as it may be described by the following claims.

What is claimed is:

1. A method for viewing an image comprising the steps of:
applying an increasing ramp of phase retardance across an image in a rear retarder; and
applying a decreasing ramp of phase retardance across the image in a front retarder so a constant phase retardance is created across an entire surface of a screen disposed behind the rear retarder and the front retarder when seen by a viewer in front of the front retarder.

2. An apparatus for viewing an image comprising:
a screen on which an image of a superimposed projection for left and right eye views of a viewer is displayed;
means for projecting the projections onto the screen;
a rear retarder disposed in front of the screen;
a front retarder disposed in front of the rear retarder; and
means for applying an increasing ramp of phase retardance across an image in the rear retarder, and applying a decreasing ramp of phase retardance across the image in the front retarder so a constant phase retardance is created across an entire surface of the screen disposed behind the rear retarder and the front retarder when seen by a viewer in front of the front retarder.

3. An apparatus as described in claim 2 wherein the projecting means includes a right eye projector and a left eye projector for right and left eye views, respectively, on the screen.

4. An apparatus as described in claim 3 wherein the right eye projector and the left eye projector have orientations orthogonal to each another.

5. An apparatus as described in claim 4 wherein the applying means includes a dual-head video card for controlling outputs for the right eye projector and the left eye projector.

6. An apparatus as described in claim 5 wherein the applying means includes a computer which controls the video card.

7. An apparatus as described in claim 6 wherein the applying means includes an electronic system for controlling the front retarder and the rear retarder, the electronic system in communication with the computer.

8. An apparatus for viewing an image comprising:
 an eye tracker which tracks positions of the eyes of a viewer; and
 a display mechanism in communication with the eye tracker which produces a display such that there is a first point and a second point in space whereby the sum of phase is zero for the first point and 0+180 degrees for the second point.

9. An apparatus as described in claim 8 wherein the display mechanism includes a screen on which an image of a superimposed projection for left and right eye views of a viewer is displayed;
 means for projecting the projections onto the screen;
 a rear retarder disposed in front of the screen;
 a front retarder disposed in front of the rear retarder; and
 means for applying an increasing ramp of phase retardance across an image in the rear retarder, and applying a decreasing ramp of phase retardance across the image in the front retarder so a constant phase retardance is created across an entire surface of the screen disposed behind the rear retarder and the front retarder when seen by a viewer in front of the front retarder.

10. An apparatus as described in claim 2 wherein the projecting means includes a right eye projector and a left eye projector for right and left eye views, respectively, on the screen.

11. An apparatus as described in claim 3 wherein the right eye projector and the left eye projector have orientations orthogonal to each another.

12. An apparatus as described in claim 4 wherein the applying means includes a dual-head video card for controlling outputs for the right eye projector and the left eye projector.

13. An apparatus as described in claim 5 wherein the applying means includes a computer which controls the video card.

14. An apparatus as described in claim 6 wherein the applying means includes an electronic system for controlling the front retarder and the rear retarder, the electronic system in communication with the computer.

* * * * *